INVENTOR.
WILLIAM D. ROGERS
ATTORNEYS

INVENTOR.
WILLIAM D. ROGERS
BY
Pierce, Wilson & Pierce
ATTORNEYS

United States Patent Office 3,453,715
Patented July 8, 1969

3,453,715
METHOD OF MAKING A TEMPERATURE SENSING BULB
William D. Rogers, Wauseon, Ohio, assignor to Sheller-Globe Corporation, Toledo, Ohio, a corporation of Ohio
Filed Dec. 12, 1966, Ser. No. 600,917
Int. Cl. B21d *51/00;* B23k *31/02*
U.S. Cl. 29—416                                    1 Claim

ABSTRACT OF THE DISCLOSURE

Temperature sensing bulbs of the type having a cylindrical main body portion one end of which is closed and the other end of which is provided with a reduced diameter capillary tube extending therefrom have been fabricated from tubular stock. The main cylindrical body has been formed from tubular stock wherein one end is swaged closed and sealed by brazing, soldering or the like. The opposite end of the main cylindrical body is swaged to a decreased diameter, and a capillary tube is sealed thereto by brazing, soldering or the like. The manufacturing process employs relative expensive materials in an expensive and time consuming assembly operation. Of course, it will be apparent that in order to assure that the assembly is hermetically sealed, considerable care must be given to the swaging and sealing operations.

---

The present invention involves a process for manufacturing temperature sensing bulbs which is achieved through a stamping operation wherein the main cylindrical body and associated capillary tube are formed in sheet metal half-sections which in turn are resistance welded together to form the resultant composite product.

It is a primary object of the invention to produce a method of making temperature sensing bulbs involving a substantial reduction in the manufacturing steps and a reduction in the cost of the resultant product.

The above and other objects of the invention can be achieved by a method of making a hollow cylindrical body having a closed end and a capillary conduit extending from the opposite end including the steps of feeding a strip of the sheet material along a path, removing selected portions of the metal of said strip to develop a blank inset strip to be formed, forming the blank by cooperating die members to produce an elongate cavity having one closed end and the opposite end having a restricted channel in communication with and extending away from the cavity, superimposing in mirrored image relationship two of the formed blanks, and hermetically sealing the superimposed blanks.

Other objects and advantages of the invention will become readily apparent to those skilled in the art from reading the following detailed description of an embodiment of the invention when considered in the light of the accompanying drawings, in which.

Figure 1:
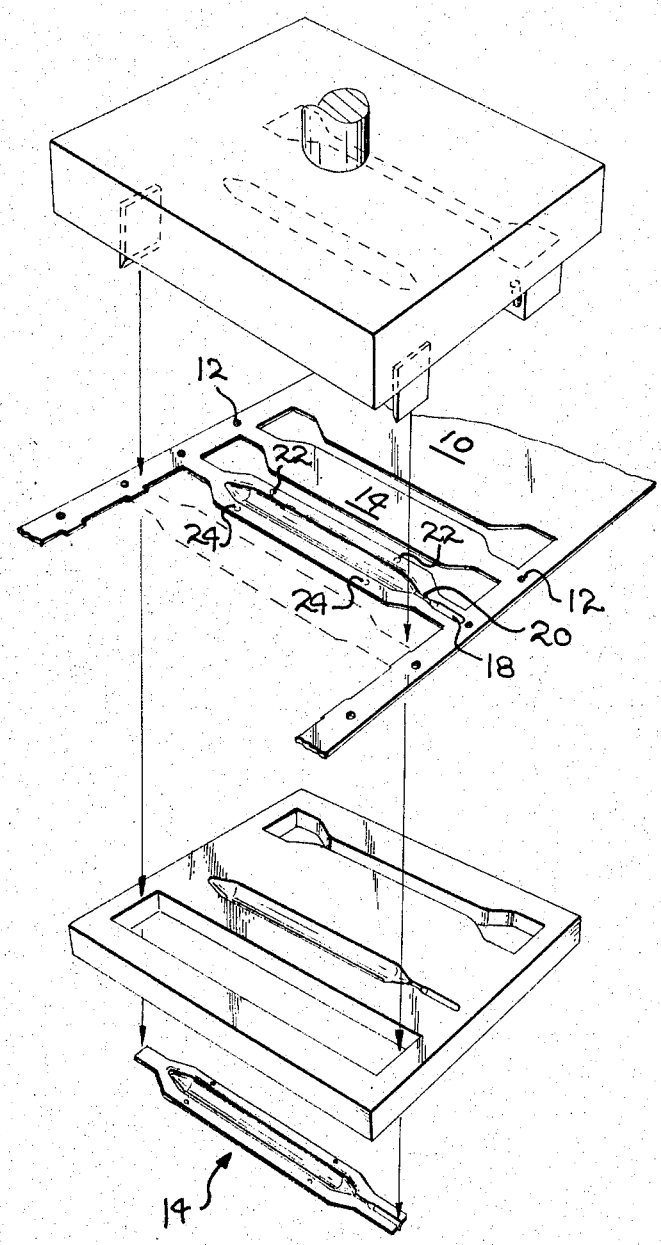
FIGURE 1 is a top plan view of a portion of the strip of metal formed in accordance with the invention.

Referring to the drawings and particularly to FIGURE 1 there is illustrated a strip of sheet metal stock 10 being fed along a path from a supply coil (not shown). Typically, the sheet metal stock 10 is fed through a set of straightening rolls (not shown) after being paid off from the supply coil in order to effectively straighten the metal stock prior to being fed to an associated stamping press. The stamping press used to perform the following operation is of conventional design employing a multi-station set of cooperating die members wherein the bottom die member or anvil is generally stationary and the top die member is moved vertically toward and away from the bottom die member.

Initially, pilot holes 12 are formed in the carrying material in each of the marginal edge portions of the strip of sheet metal stock 10. The pilot holes 12 are used to guide the metal stock 10 into proper registration within the associated dies of the stamping press employed to perform the various stamping operations to be explained in greater detail hereinafter.

Suitable guide pins of the associated stamping press are caused to enter the respective pilot holes 12 and cause the stock 10 to align properly in the stamping die to ready the stock for the next operation. The pair of cooperating die members are then caused to close to effectively remove a portion of the metal to form the trailing edge portion of one of the blanks being formed and the leading edge portion of the following blank to be formed. The blanks being formed are indicated generally by the reference numeral 14. Following the blanking operation, the cooperating die members function to form or draw the metal material of the blank 14 to produce and elongate hemilateral cylindrical body 16 and a hemilateral venturi passage 20. Simultaneously, a pair of spaced apart upwardly extending impressions 22 are formed along the marginal portion of the trailing edge of the blank 14 and a pair of spaced apart upwardly extending impressions 24 are formed along the leading marginal edge portions of the blank 14.

The final stamping operation effectively trims the blank 14 from the carrying material of the strip 10 allowing the formed part (illustrated in FIGURES 2 and 3) to fall on a conveyor below the die members of the press or otherwise removed therefrom.

Figure 2:
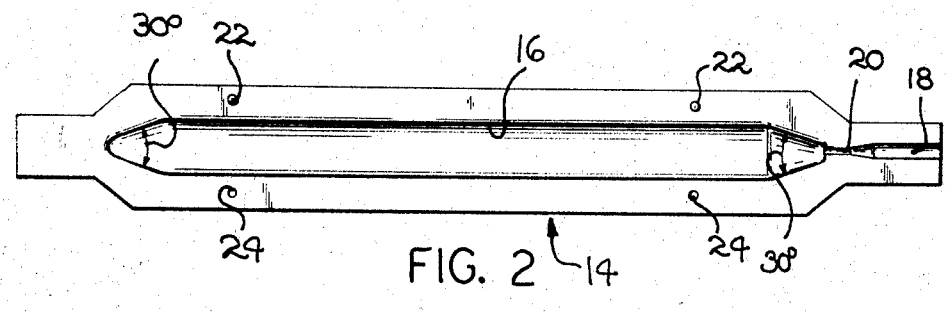
FIGURE 2 is a top plan view of one of the completed sections of the formed strip.

It will be noted from an examination of FIGURE 2 that the typical included angle of the end of the hemilateral cylindrical body 16 is approximately 30° on the preferred embodiment.

Figure 3:
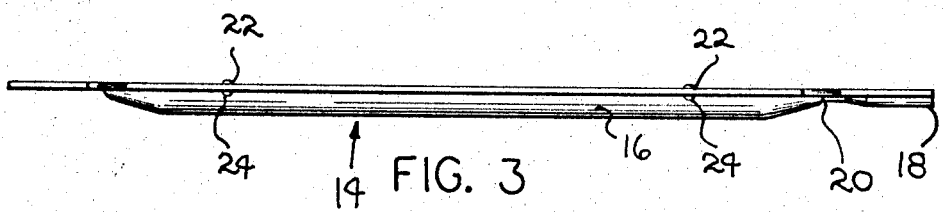
FIGURE 3 is an elevational view of the structure illustrated in FIGURE 2.
Figure 4:
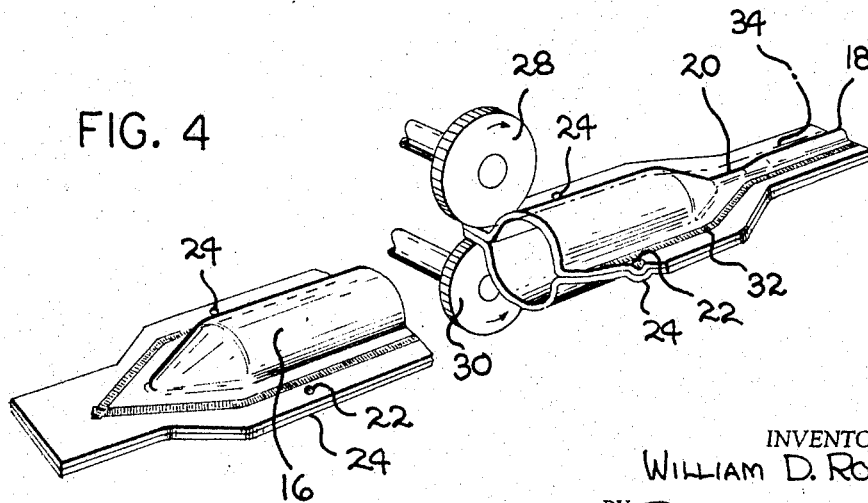
FIGURE 4 is a perspective view showing two of the structures illustrated in FIGURES 2 and 3 superimposed in mirror relationship and being welded together.

A pair of the completed or stamped parts illustrated in FIGURES 2 and 3 is then assembled in mirror image relationship wherein the impressions 22 of one of the parts aligns with and is received by the depression 24 in the other of the pair of parts. This enables proper alignment of the parts, whereby the hemilateral cylindrical body portion 16 of the parts cooperate to produce an elongate cylindrical body having one end closed and the opposite end of reduced diameter communicating with a venturi passage produced by the cooperating hemilateral venturi passages 20 and a channel produced by the cooperation of the hemilateral channel 18 of the respective parts.

The assembled pair of parts is then fed between a pair of electrical resistance welding electrodes 28 and 30 which cooperate to produce a seam weld 32 along one side of the assembled part; and then the assembly is rotated through 180° and the same welding electrodes 28 and 30 are employed to resistance weld the opposite side producing a seam weld 34.

It will be appreciated from the above description that the invention has produced a temperature sensing bulb with a cylindrical main body portion having one end closed and the opposite end cooperating with a venturi capillary conduit without the necessity of swaging, brazing, or soldering operations.

According to the provision of the patent statutes, I have explained the principles and mode of my invention and have illustrated and described what I now consider to represent its best embodiment. However, I desire to have it understood that, within the scope of the appended claims the invention may be practiced otherwise than as specifically illustrated and described.

What I claim is:

1. A method of making a hollow cylindrical body having a closed end and a capillary conduit extending from the opposite end including the steps of:

feeding a strip of sheet metal along a path;

removing selected portions of the metal of said strip to develop a blank in said strip to be formed;

forming said blank by cooperating die members to produce an elongate cavity having one closed end and the opposite end having a restricted channel in communication with and extending away from the cavity;

separating said formed blank from said strip;

superimposing in mirrored-image relationship two of the formed blanks; and hemetically sealing the superimposed blanks.

References Cited

UNITED STATES PATENTS

| | | |
|---|---|---|
| 2,045,693 | 6/1936 | Broder _____ 73—373 |
| 2,458,183 | 1/1949 | Manning. |
| 2,568,512 | 9/1951 | Reilly et al. _____ 29—463 |
| 2,675,774 | 4/1954 | Bergan _____ 113—119 |
| 2,713,195 | 7/1955 | Hemmer _____ 29—463 X |
| 2,727,299 | 12/1955 | Klumpp _____ 113—119 X |
| 2,800,945 | 7/1957 | Schilling _____ 29—463 X |
| 2,920,682 | 1/1960 | Lindberg _____ 29—463 X |
| 3,163,485 | 12/1964 | Kruitwagen et al. |

FOREIGN PATENTS 55,617    6/1937    Norway.

CHARLIE T. MOON, *Primary Examiner.*

U.S. Cl. X.R.

29—183, 417, 463, 481; 73—373; 113—120